Figure 1:
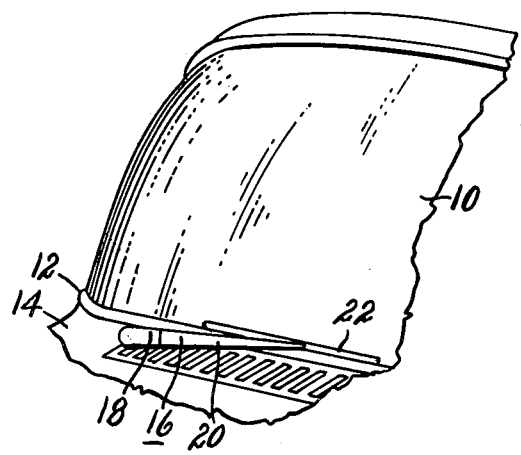

Oct. 9, 1962

F. M. RYCK 3,056,990

WINDSHIELD WIPER ARM ATTACHMENT

Filed Oct. 14, 1959

INVENTOR.
FRANCIS M. RYCK

BY

W. E. Finder

HIS ATTORNEY

United States Patent Office 3,056,990
Patented Oct. 9, 1962

1

3,056,990
WINDSHIELD WIPER ARM ATTACHMENT
Francis M. Ryck, Rochester, N.Y., assignor to General Motors Corporation, Detroit, Mich., a corporation of Delaware
Filed Oct. 14, 1959, Ser. No. 846,413
4 Claims. (Cl. 15—250.34)

This invention pertains to windshield wipers, and particularly to an improved means for attaching a wiper arm to a wiper shaft to permit infinite angular adjustment therebetween.

Heretofore, numerous means for attaching wiper arms to wiper blades have been devised. However, the majority of prior art devices of this type do not permit infinite angular adjustment of the arm relative to its actuating shaft, which arrangement is highly desirable since it facilitates accurate positioning of the wiper blade against the lower reveal molding of the windshield when the wiper blades are parked. The present invention relates to friction locking means for attaching a wiper arm to its pivot shaft which, when released, permit infinite angular adjustment therebetween. Accordingly, among my objects are the provision of friction locking means for attaching a wiper arm to a pivot shaft so as to facilitate infinite angular adjustment therebetween; the further provision of attachment means of the aforesaid type including a clamping plate adapted to wedgingly engage the pivot shaft; the still further provision of wiper arm attachment means of the aforesaid type including a spring actuated clamping plate; and the still further provision of wiper arm attachment means of the aforesaid type including a transversely movable clamping plate.

The aforementioned and other objects are accomplished in the present invention by incorporating a plate in the inner arm section having an aperture through which the pivot shaft extends in combination with means for positioning the clamping plate so that the aperture therein and the socket recess are misaligned. Specifically, three embodiments of the improved wiper arm attachment means are disclosed herein. In all embodiments the wiper arm includes spring hinge connected inner and outer sections, the inner section having a socket recess adapted to receive the end of the actuating shaft. The end of the actuating shaft may have a smooth periphery, or may have an axially serrated portion.

In one embodiment, a clamping plate is pivotally attached to the inner arm section on an axis arranged transverse to the axis of the actuating shaft and spaced radially therefrom. The clamping plate has an aperture therethrough which is normally aligned with the socket recess. The inner arm section is formed with a threaded opening spaced from and parallel to the axis of the actuating shaft which receives a screw. The end of the screw engages the clamping plate so that when the screw is tightened the aperture in the clamping plate is misaligned with respect to the socket recess thereby drivingly interconnecting the arm and the pivot shaft.

In a second embodiment the clamping plate is pivotally attached to the inner arm section and serves a dual purpose of locking the inner arm section to the pivot shaft and also as a retainer for the inner end of the pressure applying spring. The pressure applying spring reacts against the clamping plate to misalign the aperture therein with respect to the arcuate recess and thereby drivingly interconnect the arm and the pivot shaft.

In a third embodiment the inner arm section to formed with a transverse slot which intersects the socket recess. A clamping plate is disposed within the slot, the clamping plate having an integral stud extending therefrom for receiving a nut. When the actuating shaft is inserted through the clamping plate and into the socket recess, and the nut is tightened, the aperture in the clamping plate is misaligned with respect to the socket recess so as to drivingly interconnect the wiper arm and the wiper shaft.

In all of the embodiments, when the locking means are released, the wiper arm is infinitely angularly adjustable relative to the actuating shaft.

Further objects and advantages of the present invention will be apparent from the following description, reference being had to the accompanying drawings, wherein preferred embodiments of the present invention are clearly shown, and wherein similar numerals depict similar parts throughout the several views.

Figure 4:
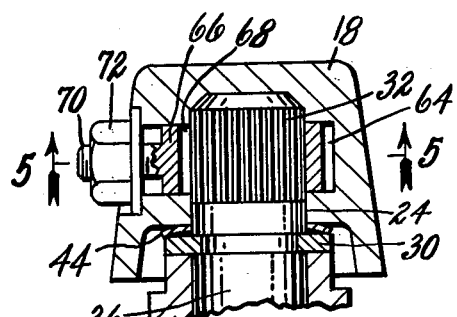
Figure 2:
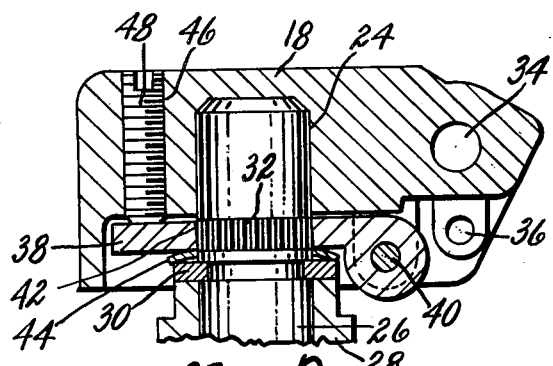
Figure 5:
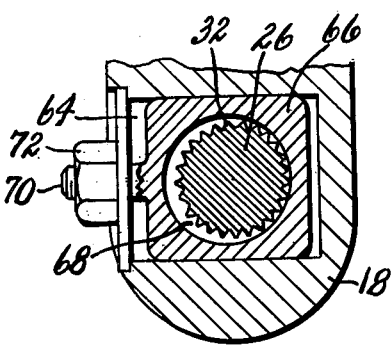
Figure 3:
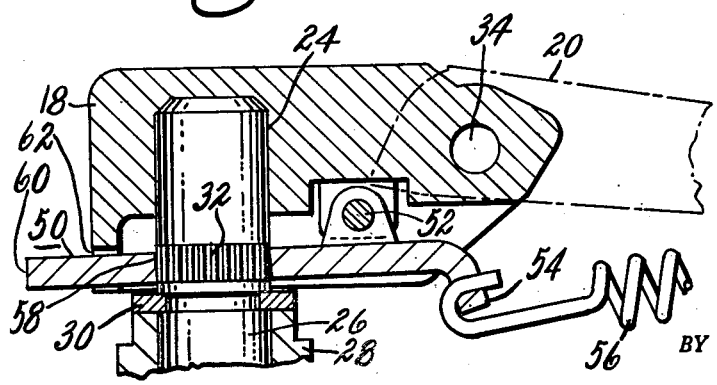

In the drawing:
FIGURE 1 is a fragmentary view of a portion of a motor vehicle including a windshield wiper arm having the attachment means of the present invention.
FIGURE 2 is a fragmentary view, partly in section and partly in elevation, of the attachment means constructed according to one embodiment of the present invention.
FIGURE 3 is a view similar to FIGURE 2 depicting the attachment means constructed according to a second embodiment of the present invention.
FIGURE 4 is a fragmentary view, partly in section and partly in elevation, depicting a third embodiment of the improved arm attachment means.
FIGURE 5 is a sectional view taken along line 5—5 of FIGURE 4.

With particular reference to FIGURE 1, a portion of a vehicle is shown including a windshield 10 having a lower reveal molding 12. An actuating, or pivot shaft, not shown in FIGURE 1, extends through the vehicle cowl 14 on each side of the windshield to which a wiper arm 16 is drivingly connected. The wiper arm 16 includes spring hinge connected inner and outer sections 18 and 20, the outer section of which carries a wiper blade 22 adapted for oscillatory movement across the outer surface of the windshield.

With particular reference to FIGURE 2, in the first embodiment of the improved arm attachment means, the inner arm section 18 comprising a die casting, is formed with a socket recess 24 adapted to receive the end of a pivot shaft 26. The pivot shaft 26 is journalled for rotation in a housing 28 by suitable bearing means, not shown, and is formed with an annular groove spaced from the end thereof which receives a retaining ring 30. The retaining ring 30 functions to limit axial movement of the pivot shaft relative to the housing 28. A portion of the periphery of the outer end of the pivot shaft 26 may be axially serrated as indicated by numeral 32. Alternately, the periphery of the outer end of the pivot shaft may be smooth.

The inner arm section 18 is formed with a transverse opening 34 adapted to receive a hinge pin for pivotally interconnecting the inner and outer sections. In addition, the inner arm section 18 is formed with a second transverse opening 36 adapted to support a spring retainer to which one end of the pressure applying spring may be attached. In addition, a clamping plate 38 is pivotally attached to the inner arm section by means of a pin 40, the axis of the pin 40 being transverse to the axis of the pivot shaft 26 and spaced therefrom. The clamping plate 38 has an aperture 42 therein of slightly greater diameter than the diameter of the pivot shaft 26. The aperture 42 is normally aligned with the socket recess 24 to facilitate assembly and withdrawal of the inner arm section 18 from the pivot shaft 26.

In assembling the inner arm section 18 with the pivot shaft 26, a spring washer 44 is placed over the pivot shaft 26 in engagement with the retaining ring 30. Thereafter, the inner arm section 18 is placed over the outer end of the pivot shaft 26. The inner arm section 18 also includes a threaded opening 46, the axis of which is spaced from and parallel to the axis of the socket recess, which threaded opening receives a screw 48. The inner section of the screw 48 engages the clamping plate 38, such that when the screw 48 is tightened the clamping plate 38 will be pivoted about the axis of the pin 40 to misalign the aperture 42 with respect to the socket recess 24. By misaligning the aperture 42 with respect to the socket recess 24, the inner arm section 18 is drivingly connected with the pivot shaft by friction clamping. When the screw 48 is partially withdrawn, the aperture 42 can be aligned with the socket recess 24 so as to permit infinite angular adjustment of the inner arm section relative to the pivot shaft 26. As aforementioned, the pivot shaft 26 may either have a smooth periphery or have an axially serrated portion. In either event, the action of the clamping plate 38 is identical in that the pivot shaft 26 becomes locked with the inner arm section 18 when the aperture 42 in the clamping plate is misaligned with respect to the socket recess 24.

With reference to FIGURE 3, in the second embodiment the inner arm section 18 is likewise formed with a socket recess 24 for receiving the end of the pivot shaft 26. The pivot shaft 26 is shown having an axially serrated portion 32 aligned with a clamping plate 50 which is pivotally connected to the inner arm section by a pin 52 arranged transversely relative to the socket recess 24. In the embodiment shown in FIGURE 3, the clamping plate 50 is formed with a downwardly turned extension 54 constituting a retainer through which one end of the pressure applying spring 56 is attached. The other end of the pressure applying spring 56 is attached to the outer arm section 20, and biases the outer arm section towards the windshield about the transverse pivot located in opening 34.

The clamping plate 50 is formed with a circular aperture 58 and the other end 60 thereof extends through a slot 62 in the inner arm section 18. The spring 56 normally positions the clamping plate 50 so that the aperture 58 is misaligned with respect to the socket recess 24 thereby establishing a driving connection between the pivot shaft 26 and the inner arm section 18. In order to release the friction lock, the outer end 60 of the clamping plate 50 is pressed upwardly so as to pivot in a clockwise direction about the pin 52 to align the aperture 58 with the socket recess 24 to permit angular adjustment of the inner arm section relative to the pivot shaft, or permit removal of the inner arm section from the pivot shaft.

With reference to FIGURES 4 and 5, in the third embodiment the inner arm section 18 is formed with a socket recess 24 and a transverse slot 64 which intersects the socket recess 24. A clamping plate 66 is disposed within the slot 64, the clamping plate 66 having a circular aperture 68, as seen particularly in FIGURE 5. In addition, the clamping plate 66 is formed with an integral stud 70 adapted to receive a nut 72.

In assembling the inner arm section 18 as shown in FIGURES 4 and 5 with the pivot shaft 26, the nut 72 is disengaged from the stud 70 to permit the aperture 68 in the clamping plate 66 to be aligned with the socket recess 24. The pivot shaft 26 can then be inserted into the socket recess through the aperture 68, and the inner arm section adjusted to any angular position. When the nut 72 engages the stud 70 and is tightened thereupon, the clamping plate 66 is drawn to the left, as viewed in FIGURE 4, thereby misaligning the aperture 68 with respect to the socket recess 24 so as to frictionally clamp the inner arm section 18 in driving engagement with the serrated portion 32 of the pivot shaft 26.

From the foregoing it is readily apparent that the present invention discloses a unique means for frictionally locking a wiper arm to its actuating shaft, which, when released, will permit infinite angular adjustment of the wiper arm relative to the actuating shaft.

While the form of the embodiments of the invention as herein disclosed constitute preferred forms, it is to be understood that other forms might be adopted.

What is claimed is as follows:

1. In a windshield wiper organization, an actuating shaft having an outer end with an axially serrated portion, a wiper arm having spring hinge connected inner and outer sections, the inner section having a socket recess adapted to receive the outer end of said actuating shaft, a plate pivotally attached to said inner arm section on an axis transverse to the axis of said actuating shaft, said plate being aligned with the axially serrated portion of said of said shaft and having an aperture normally aligned with the socket recess and through which said actuating shaft extends, and means engageable with said plate for moving the same relative to said inner arm section to misalign the aperture in said plate with respect to the socket recess so as to frictionally lock the inner arm section in driving relation with the actuating shaft.

2. In a windshield wiper organization, an actuating shaft having an outer end with an axially serrated portion, a wiper arm having hinged inner and outer sections, a spring interconnecting said inner and outer sections for biasing the outer section toward an associated windshield, the inner section having a socket recess adapted to receive the outer end of said actuating shaft, and a plate pivotally attached to said inner arm section on an axis transverse to the axis of said actuating shaft, said plate being aligned with the axially serrated portion of said shaft and having an aperture normally aligned with the socket recess and through which said actuating shaft extends, said spring being connected to said plate for moving the same relative to said inner arm section to misalign the aperture in said plate with respect to the socket recess so as to frictionally lock said inner arm section in driving relation with the actuating shaft.

3. The windshield wiper organization set forth in claim 2 wherein said inner arm section has a side wall slot intersecting the socket recess thereof, and wherein said plate extends through said slot and terminates exteriorly of said inner arm section whereby said friction lock can be released by manual pivotal movement of said plate against the bias of said spring.

4. In a windshield wiper organization, an actuating shaft having an outer end with an axially serrated portion, a wiper arm having spring hinge connected inner and outer sections, the inner section having a socket recess adapted to receive the outer end of said actuating shaft, a plate pivotally attached to said inner arm section on an axis transverse to the axis of said actuating shaft, said plate being aligned with the axially serrated portion of said shaft and having an aperture normally aligned with the socket recess and through which said actuating shaft extends, and a threaded device engaging said inner arm section and engageable with said plate for moving the same relative to said inner arm section to misalign the aperture in said plate with respect to the socket recess so as to frictionally lock said inner arm section in driving relation with the actuating shaft.

References Cited in the file of this patent

UNITED STATES PATENTS

| 2,161,965 | Liner | June 13, 1939 |
| 2,269,623 | Ehrlich | Jan. 13, 1942 |

FOREIGN PATENTS

| 848,754 | Germany | Sept. 8, 1952 |